United States Patent [19]

Steffes et al.

[11] Patent Number: 4,824,182

[45] Date of Patent: Apr. 25, 1989

[54] ANTI-LOCK HYDRAULIC BRAKE SYSTEM FOR AUTOMOTIVE VEHICLES

[75] Inventors: Helmut Steffes, Hattersheim; Norbert Ocvirk, Offenbach; Gunther Buschmann, Griesheim; Anton David, Goetzenhain; Johannes Graeber, Frankfurt am Main; Otto Determann, Darmstadt; Ivica Batistic, Frankfurt am Main, all of Fed. Rep. of Germany

[73] Assignee: Alfred Teves GmbH, Frankfurt am Main, Fed. Rep. of Germany

[21] Appl. No.: 92,974

[22] Filed: Sep. 4, 1987

[30] Foreign Application Priority Data

Sep. 5, 1986 [DE] Fed. Rep. of Germany ....... 3630342

[51] Int. Cl.$^4$ .......................... B60T 8/88; B60T 17/22
[52] U.S. Cl. ...................................... 303/92; 303/114; 303/119; 303/DIG. 4; 73/121; 340/452
[58] Field of Search ................. 303/114, 119, 100, 92, 303/118, 20, 116, 111, 113, 10–12, 61–63, 68–69, DIGS. 1–4, 84; 73/121, 39, 40, 122–132; 340/52 C; 364/426; 188/345, 181, 151 A

[56] References Cited

U.S. PATENT DOCUMENTS

| | | | |
|---|---|---|---|
| 3,729,235 | 4/1973 | Bach et al. | 303/114 |
| 3,768,874 | 10/1973 | Riordan | 303/114 |
| 3,796,469 | 3/1974 | Birge | 303/92 |
| 3,866,980 | 2/1975 | Eisele et al. | 303/92 |
| 3,881,779 | 5/1975 | Machek | 303/118 |
| 3,948,568 | 4/1976 | Leiber | 303/92 |
| 4,192,180 | 3/1980 | Gerstenmeier et al. | 73/121 |
| 4,340,935 | 7/1982 | Anlauf et al. | 73/121 X |
| 4,346,944 | 8/1982 | Leiber | 303/119 |
| 4,484,784 | 11/1984 | Leiber | 303/92 |
| 4,520,663 | 6/1985 | Moore et al. | 73/129 |
| 4,523,791 | 6/1985 | Belart et al. | 303/DIG. 4 |
| 4,550,954 | 11/1985 | Leiber | 303/DIG. 4 X |
| 4,660,897 | 4/1987 | Leiber | 303/114 |
| 4,662,687 | 5/1987 | Leiber | 303/92 X |
| 4,702,531 | 10/1987 | Kircher et al. | 303/119 X |
| 4,719,796 | 1/1988 | Zenker | 73/121 |

FOREIGN PATENT DOCUMENTS

| | | |
|---|---|---|
| 2310293 | 9/1973 | Fed. Rep. of Germany . |
| 2345860 | 3/1975 | Fed. Rep. of Germany . |
| 2611369 | 9/1977 | Fed. Rep. of Germany . |
| 3227265 | 1/1984 | Fed. Rep. of Germany . |
| 3317629 | 11/1984 | Fed. Rep. of Germany . |
| 2342307 | 12/1984 | Fed. Rep. of Germany . |

OTHER PUBLICATIONS

Publication "Erfahrungen bei der Konzeption und Entwicklung des Mercedes–Benz/Bosch Anti–Blockier–Systems (ABS) from Automobiltechnische Zeitschrift", 81, (1979) 5.

Primary Examiner—Douglas C. Butler
Attorney, Agent, or Firm—James B. Raden

[57] ABSTRACT

An anti-lock hydraulic brake system which includes a brake pressure generator composed of a master cylinder, a brake power booster inserted upstream thereof and a pressure modulator interposed between the master cylinder and the brake power booster. A resetting unit is formed by supplementing the pressure modulator with a valve assembly which connects a resetting chamber of the pressure modulator to either a pressure-compensating reservoir or an auxiliary-pressure source. The braking pressure in the wheel brakes is controlled, according to a time-multiplex method, by wheel valves inserted into the pressure-fluid conduits and by the pressure modulator. In order to check the operability of the brake and of the anti-lock control system, a pressure switch is connected to the pressure modulator and a test circuit is provided which, at predetermined points of time, initiates a test cycle, actuates the valves and compares the valves' operation with the reaction of the pressure switch.

6 Claims, 2 Drawing Sheets

ANTI-LOCK HYDRAULIC BRAKE SYSTEM FOR AUTOMOTIVE VEHICLES

BACKGROUND OF THE INVENTION

The present invention relates to an anti-lock hydraulic brake system for automotive vehicles equipped with a pedal-actuated braking pressure generator. The system includes a master cylinder with a brake power booster inserted upstream thereof and a hydraulically controlled pressure modulator interconnected between the master cylinder and the brake power booster. An auxiliary-pressure source and a pressure-compensating reservoir are connected to said pressure modulator via electrically actuatable valves of a valve assembly. The pressure modulator serves to generate a resetting force opposing the pedal force, the resetting force reducing or compensating for the force which is transmitted to the master cylinder pistons on brake application. The system is further equipped with wheel valves which are inserted into the pressure-fluid conduits leading from the braking pressure generator to the wheel brakes individually or to the wheel brakes jointly. These wheel valves are controllable by an anti-lock controller and serve to shut off the pressure-field conduits.

A brake system of this general type is disclosed in German published patent application No. 33 17 629 wherein the braking pressure is controlled by a time-multiplex method for slip control. For this purpose, electromagnetically actuatable multidirectional control valves are inserted into the pressure-fluid conduits by which the wheel brakes are connected individually and/or in pairs to the braking pressure generator. These valves allow opening or closing of the pressure-fluid passage. The control valves also enable production of an auxiliary force which counteracts the pedal force and enables reduction of the force applied on the pistons in the master cylinder for slip control. Thus the braking pressure generated in the master cylinder is also reduced. When all the wheels run without locking, all the wheel valves (i.e., those valves inserted between the braking presure generator and the wheel brakes) are switched to open passage and thus communicate with the master cylinder. In the event of an imminent locked condition at any one wheel, the wheel valves leading to all of the other wheels are switched to closed positions for a short time so that only the pressure-fluid circuit of the imminently locking wheel is still connected to the master cylinder. Then, an auxiliary force is built up which acts, either partially or completed, against the (auxiliary-force-assisted) brake-pedal pressure whereby the braking pressure is reduced at the imminently locking wheel. The pressure remains constant in this phase in all of the other wheels. After the pressure has been reduced until attainment of the pressure level desired, the reduced pressure at the wheel which initially became unstable will be maintained constant by valve change-over. After the decrease of the counter force and the renewed pressure development in the master brake cylinder, the braking pressure build-up can be continued in the other wheel brakes. In this manner, the braking pressure at each wheel can be successively set to the desired value calculated by the associated electronics.

If, in the capacity of a pressure modulator, a hydraulically displaceable piston interposed between the master cylinder and the brake pedal or the brake power booster inserted upstream thereof is used in an anti-lock brake system for generating the brake force opposed to the pedal force, it must be assured that this piston will not prevent the transmission of the pedal force to the master cylinder when normal braking is performed (i.e., prior to commencement of slip control). This is because any inadvertent locking of the piston would render the brake out of action. Therefore, the working chamber into which auxiliary pressure is introduced for generating the force opposed to the pedal (i.e., the resetting force) must be open to a pressure-compensating reservoir in the normal case prior to commencement of anti-lock control.

SUMMARY OF THE INVENTION

It is an object of the present invention to safeguard the operability of the brakes in an anti-lock brake system. Possible problems, particularly in regard to the case of a pressure-fluid conduit intended to connect the working chamber of the resetting unit or of the pressure modulator to the pressure-compensating reservoir being closed due to a defect or malfunction, should be detected and signalled at an early time in order to draw the driver's attention to the danger of brake failure.

This object can be achieved in a simple, technically advanced manner by an anti-lock hydraulic brake system wherein a pressure-measuring element is connected to the pressure modulator and the system being furnished with a test circuit which, at predetermined points of time, initiates a test cycle. In this test cycle, the corresponding valves of the valve assembly are actuated so that pressure fluid out of the auxiliary-pressure source can be metered into the pressure modulator and can be discharged from the modulator. As a result thereof, the pressure variation determined by the pressure-measuring element can be evaluated depending upon the valve actuation as a criterion for the operability of the system and, more particularly, of the valves connected to the pressure modulator.

Thus, the present invention insures in a simple fashion and by simple means that a defect which might jeopardize the operability of the brake system will be recognized at an early time. The instant invention is based on the consideration that, even by a redundant design of the valve assembly requiring the valves to assume a specific switch position for preserving the operability of the brake, sufficient safety will not be achieved without the inventive improvement herein because the existence of a defective component part will not be recognized at all or will be hard to recognize as long as the intact component part maintains its function. Such a concealed fault can have calamitous effects if the redundant system subsequently fails as well.

Another advantage of this invention resides in the fact that the component parts necessary for anti-lock control can be simultaneously monitored.

According to a preferred embodiment of this invention, the test cycle is initiated on every start of the vehicle engine, while the non-actuation of the brake may be added as another condition therefor. However, it is likewise possible to activate the test cycle at predetermined fixed intervals or in dependence on any other events of relatively frequent occurrence.

A particularly straightforward and cost-efficient embodiment of the present invention is to provide, as a pressure-measuring element, a pressure-operated electric switch, the switch position of which is logically combinable with the valves' position.

In the event of redundant provision of the valves interconnecting the pressure-fluid modulator and the pressure-compensating reservoir, it is expedient to check these valves during each test cycle irrespective of one another, more specifically, one after the other.

Other features and objects of this invention will become more apparent to those skilled in the art from the following illustration of embodiments of the invention with reference to the accompanying drawings and detailed description.

DETAILED DESCRIPTION OF THE PREFERRED EMBODIMENTS

Figure 1:
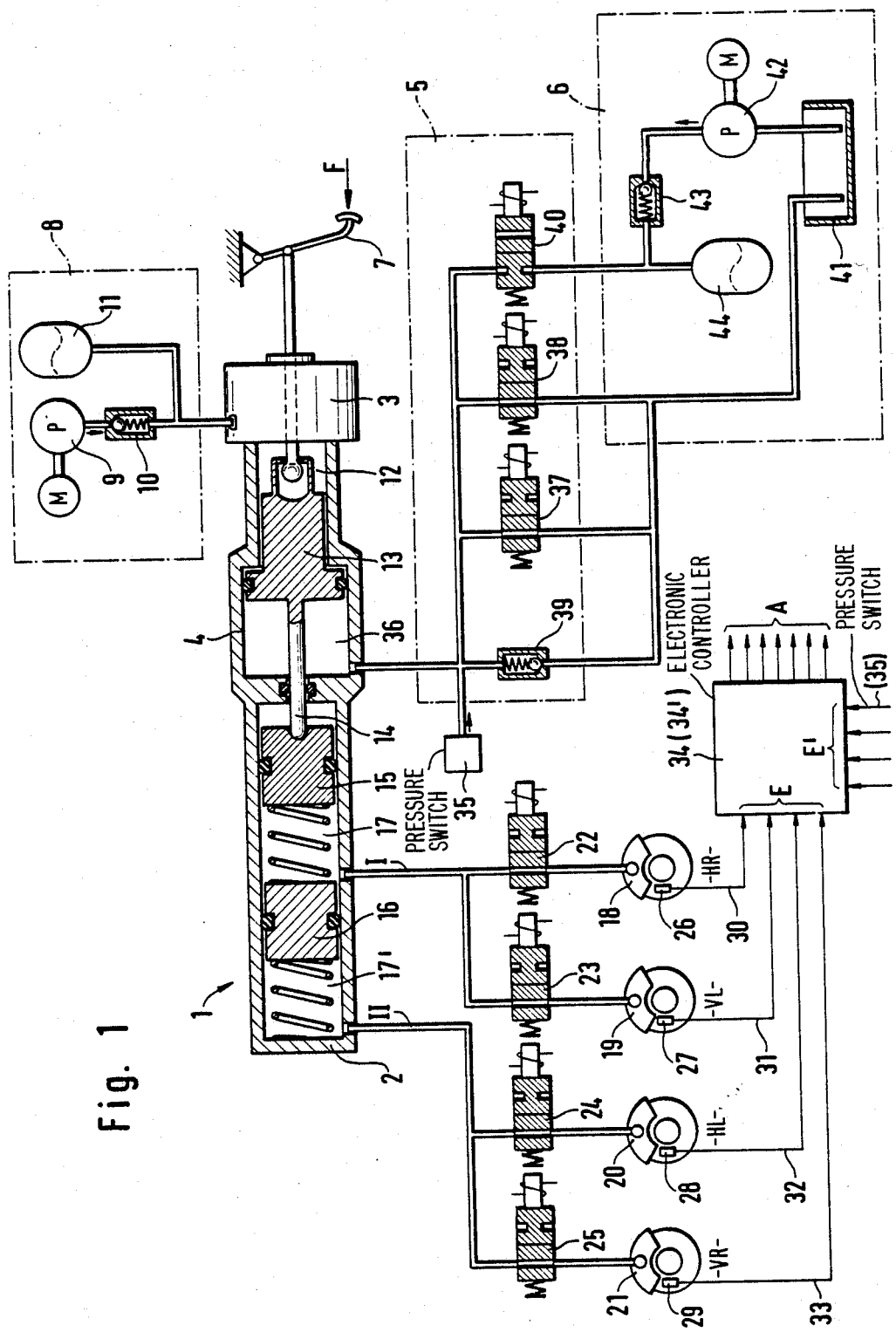
FIG. 1 is a simplified schematic view of the most important component parts and assemblies of a brake system of the present invention and FIG. 2 is a flowchart showing the course of a test cycle having a test circuit according to this invention.

A braking pressure generator 1 of an anti-lock brake system according to this invention comprises a master cylinder, herein a tandem master cylinder 2, a power brake booster 3 connected upstream thereof as well as a pressure modulator 4 interposed between the master cylinder 2 and the brake power booster 3. The pressure modulator 4 is supplemented by a valve assembly 5 and an auxiliary-pressure supply system 6 to form a resetting unit.

As a brake power booster 3, the details of which have not been shown, a known hydraulic booster can be used, which, assisted by a control valve, serves to generate a pressure proportional to the force F applied to a brake pedal 7. In the illustrated embodiment, an an auxiliary-pressure supply system 8 is connected to the control slide in the interior of the brake power booster 3. The system 8 includes an electromotively driven hydraulic pump 9 with an associated non-return valve 10 and a pressure accumulator 11 in the symbolically illustrated embodiment. It is likewise possible to connect the brake power booster 3 to a central auxiliary-pressure supply system of the vehicle.

The pedal-force-proportional pressure generated by means of the brake power booster 3 is introduced into a booster chamber 12 and acts upon a piston 13 of the pressure modulator 4 in the pedal-actuating direction. Via an actuating rod 14, the pressure prevailing in the booster chamber 12, which is proportional to the pedal force F, is transmitted to the push-rod piston 15 and to the floating piston 16 of the tandem master cylinder 2 in the two working chambers 17, 17' which are connected, respectively, to the static brake circuits I, II.

Inserted into each of the pressure-fluid conduits leading from the braking pressure generator 1 or the tandem master cylinder 2 to the wheel brakes 18, 19, 20 and 21 is a multidirectional control valve 22, 23, 24 and 25, respectively, which is opened in its initial position and which can be switched over to close. These valves are two-way/two-position directional control valves. In the illustrated embodiment, the vehicle wheels are allocated diagonally to the two brake circuits I, II. The brake circuit I leads to the left front wheel VL and the right rear wheel HR, while the brake circuit II leads to the other two wheels (i.e., the right front wheel VR and the left rear wheel HL).

The rotational behavior of the individual vehicle wheels is determined by way of wheel sensors 26, 27, 28 and 29, which, for example, may be inductive transducers. Via signal lines 30, 31, 32 and 33, the measured data about the wheel rotational behavior is fed into the input E of an electronic controller 34. By means of hardwired or programmed circuits in the interior of the controller 34, braking pressure control signals are produced after evaluation of the wheel rotational behavior and, via the output lines A and via non-illustrated signal lines, this data is fed to the wheel valves 22, 23, 24 and 25 and to the individual valves of the valve assembly 5. A test cycle is produced likewise by means of the circuits in the controller 34, namely the circuits 34', or by a corresponding program. For this reason, the controller 34, via the input lines E', is supplied with information about the brake application, about the pressure in the auxiliary-pressure supply system(s), about the response of a pressure switch 35 (the function of which will be explained hereinbelow), about the starter actuation, etc.

In the embodiment of this invention according to FIG. 1, a pressure chamber or resetting chamber 36 of the pressure modulator 4 is connected to the auxiliary-pressure source 6 via a valve assembly 5. The assembly 5 includes parallel connected multidirectional control valves 37 and 38 which are open in their inactive position and a non-return valve 39 connected in parallel to valves 37 and 38. The valve 39 can open toward the resetting chamber 36. The assembly 5 further includes a multidirectional control valve 40 which is closed in the inactive position. As multidirectional control valves, two-way/two-position directional control valves are used herein which lend themselves to particular ease of manufacture.

The parallel valves 38, 39 lead to a pressure-compensating reservoir 41 of the auxiliary-pressure source 6, while after the change-over of the valve 40 that is closed in its inactive position pressure fluid out of the auxiliary-pressure source 6 can be metered into the resetting chamber 36.

As in the auxiliary-pressure source 8, illustrated herein, the auxiliary-pressure source 6 includes an electromotively driven pressure-fluid pump 42 with an assigned non-return valve 43 and a pressure-fluid accumulator 44. In other embodiments of this invention, the auxiliary-pressure sources 6 and 8 can be united into a single source to which both the resetting unit and the brake power booster are connected or a connection to a central hydraulic system can be chosen.

The pressure-measuring element 35 is connected to the resetting chamber 36 of the pressure modulator 4, said element being designed as a pressure-operated electric switch in the simplest case.

The herein illustrated brake system operates as follows: when brake force is exerted in the direction of the arrow F on the pedal 7, a pedal-force-proportional pressure is generated in the pressure chamber 12 by the brake power booster 3. As long as the resetting chamber 36 is unpressurized, this pressure is transmitted to the tandem master cylinder 2 via the piston 13 of the pressure modulator 4 and the push rod 14 of piston 13. The braking pressure prevailing in the brake circuit I, II is transmitted to the wheel brakes 18, 19, 20 and 21 through the wheel valves 22, 23, 24 and 25 which are opened in their initial position.

In the event of an imminent locked condition at any one wheel, this information will be supplied by the wheel sensors to the controller 34 which, in response thereto, will switch over all wheel valves to a closed condition, except for the wheel valve of the imminently locking wheel, and will thus maintain the pressure constant in the associated wheel brakes. Simultaneously, the resetting chamber 36 of the pressure modulator 4 will be isolated from the pressure-compensating reservoir 41 by change-over of the redundant valves 37, 38 of the valve assembly 5 belonging to the resetting unit. Moreover, a control pulse of a specific length or a pulse train will cause the valve 40 of the valve assembly 5 to switch over for a sufficient time to allow a defined pressure, determined by the controller 34, to be built up in the resetting chamber 36 owing to the temporary connection of the auxiliary-pressure source 6. This pressure causes the piston 13 to be reset.

The piston 13 of the pressure modulator is designed as a stepped piston and is dimensioned such that the surface of this piston acted upon by the resetting pressure is larger than the application surface of the controlled pressure in the booster chamber 12. Thereby, the pressure generated by means of the pedal 7 is offset and a resetting of the piston 13 in opposition to the pedal force F is accomplished.

As a result of the resetting of the piston 13, the pressure in the working chambers 17, 17' of the master cylinder 2 and, thus, in the static brake circuits I, II will be reduced. This pressure reduction propagates via the wheel valve associated with the wheel brake of the imminently locking wheel, which continues to be in its opened condition while the pressure fluid is captured in the other wheel brakes and the pressure remains constant therein. As soon as the pressure level in the wheel brake of the wheel which became unstable has decreased until it attains the desired level, the associated wheel valve will be closed so that subsequently the pressure build-up can be continued in the other wheels, or a specific pressure can be built up in the described fashion in the wheel brakes of the other wheels, or the pressure can be decreased until attainment of the calculated pressure level. This requires pressure control in a time-multiplex manner since the pressure must be adjusted subsequently in the individual wheels in the event of varying nominal braking pressure.

In the event that the brake is applied and the auxiliary pressure fails, a push rod displaces in the pedal-actuating direction and moves into abutment with the piston 13 so that the pedal force F, without being boosted, can act upon the pistons 15, 16 of the master cylinder 2 via the piston 13 and the push rod 14. However, this action is insured only when at least one of the two valves 37, 38 provides open passage to allow the piston 13 to displace the pressure fluid in the resetting chamber 36, via these valves, into the pressure-compensating reservoir 41.

Figure 2:
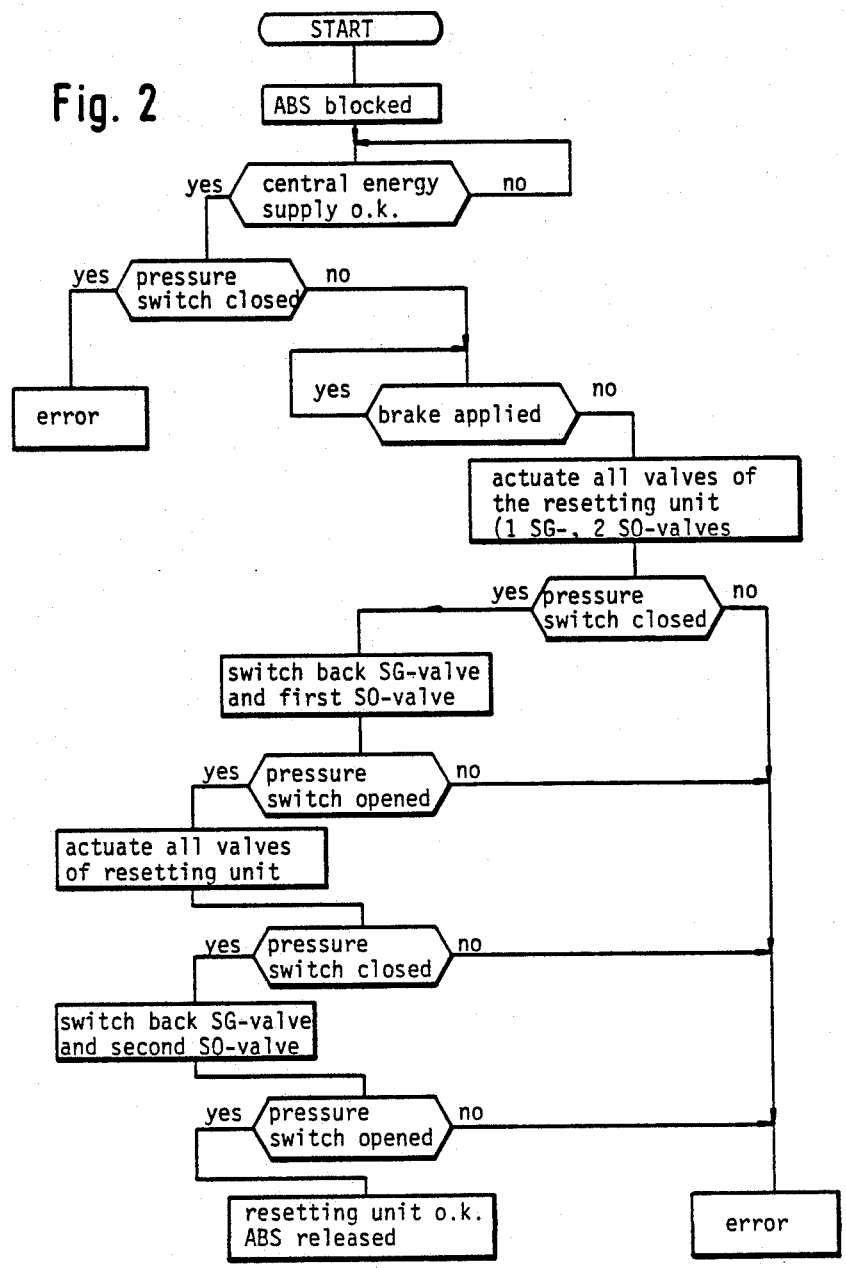

The mode of operation of the test circuit of the present embodiment is illustrated by the flowchart shown in FIG. 2.

The test cycle will commence (block marked "START") when the vehicle engine is started or upon the occurrence of any other relatively frequently occurring condition or at some other regular interval. The anti-lock control will be blocked (marked "ABS" blocked in flow chart). If auxiliary pressure is present (block marked "central energy supply o.k.") and the pressure switch is open (marked "pressure switch closed: no" in the chart) and if the brake is not applied at this point of time (marked "brake applied: no"), all valves of the valve assembly 5 included in the resetting unit will be energized and, thus, switched over. In the event of the resetting unit being in order, this results in pressure development in the resetting chamber 36 and actuation of the pressure-measuring element—pressure switch 35—(marked "pressure switch closed: yes"). Subsequently, one of the valves 37 or 38 opens the pressure-fluid conduit toward the reservoir 41 and the pressure-metering valve 40 will be switched back by the test circuit by terminating the actuating signal (block marked "switch back SG-valve and first SO-valve"). The SG-valve refers to a valve which is closed when de-energized and the SO-valve refers to a valve which opens when de-energized. The opening of the pressure-fluid conduit results in a pressure reduction in the resetting chamber 36 and, thereby, opening of the pressure switch 35 (marked "pressure switch opened: yes"). Thereafter, all switchable valves 37, 38 and 40 of the resetting unit will be actuated (block marked "actuate all valves of the resetting unit"), and it will be checked whether the pressure switch 35 closes properly again (marked "pressure switch closed: yes"). The second valve leading to the pressure-compensating reservoir 41 as well as the pressure-metering valve 40 is then switched back to de-activate the SG-valve and second SO-valve (block marked "switch back SG-valve and second SO-valve"). If this causes opening of the pressure switch (marked "pressure switch opened: yes"), the test cycle is completed because it has been found that the resetting unit is in order (block marked "resetting unit o.k.") and anti-lock control may now be activated.

From the diagram, it can be seen that any deviation from the described signal course indicates a defect or a malfunction which will be signalled.

The described test cycle may be performed utilizing hard-wired logic circuitry or by a corresponding program if the controller 34 comprises programmed circuits such as microcomputers.

What is claimed is:

1. In an anti-lock hydraulic brake system for automotive vehicles including a pedal-actuated braking pressure generator having a master cylinder with a brake power booster inserted upstream thereof and a hydraulically controlled pressure modulator interconnected between the master cylinder and the brake power booster, said pressure modulator being respectively alternately connected to an auxiliary-pressure source and a pressure-compensating reservoir by way of electrically actuatable valves of a valve assembly, said pressure modulator generating a resetting force opposing a force applied to said pedal of said braking pressure generator, the said resetting force reducing the force which is transmitted to the master cylinder pistons on brake application, said system further including wheel valves which are interposed into the pressure-fluid conduits leading from the braking pressure generator to the wheel brakes the said wheel valves being controllable by an anti-lock controller for closing the pressure-fluid conduits, the improvement comprising a pressure-measuring means connected to the pressure modulator and test circuit means which, at predetermined points of time, initiate a test cycle during which pressure fluid from the auxiliary-pressure source is metered into the pressure modulator and is subsequently discharged from the pressure modulator responsive to the actuation of corresponding ones of said valves of said valve assembly, and the corresponding pressure variation ascertained by the pressure-measuring means being evaluated as a function of the subsequent actuation of said corresponding ones of said valves connected to the pressure modulator as a criterion for operability of the system, wherein said pressure-measuring means provides a pressure reduction signal when said pressure fluid is discharged from said pressure modulator by way of actuation of at least one of said corresponding ones of said valves during said test cycle, wherein said pressure-measuring means provides a pressure increase signal when said pressure fluid is metered into said pressure modulator by way of actuation of at least one of said corresponding ones of said valves during said test cycles, and means responsive to the signals provided by said pressure-measuring means to provide an error signal when the signal provided by said pressure-measuring means fails to correspond to the actuation of the respective one of said corresponding ones of said valves during said test cycles, and means responsive to the signals provided by said pressure-measuring means to provide an error signal when the signal provided by said pressure-measuring means fails to correspond to the actuation of the respective one of said corresponding ones of said valve.

2. The brake system of claim 1 wherein the test cycle is initiated on every start of the vehicle engine.

3. The brake system of claim 1 wherein the test cycle is initiated on every start of the vehicle engine when the brake is not applied.

4. The brake system of claim 1 wherein the test cycle is initiated in predetermined intervals when the brake is not applied.

5. The brake system of claim 1 wherein the pressure measuring means is a pressure-operable electric switch having a switch position which is logically combinable with the switch position of the valve assembly.

6. The brake system of claim 1 wherein said valve assembly further includes at least two parallel connected valves interconnecting the pressure modulator and the pressure-compensating reservoir, these two parallel connected valves being checked during each test cycle irrespective of one another.

* * * * *